United States Patent Office 3,521,187
Patented July 21, 1970

3,521,187
LASER MEDIA CONTAINING COUMARIN DYE SOLUTIONS
Benjamin B. Snavely, Otis G. Peterson, and Raymond F. Reithel, Rochester, N.Y., assignors to Eastman Kodak Company, Rochester, N.Y., a corporation of New York
No Drawing. Filed Sept. 18, 1967, Ser. No. 668,710
Int. Cl. H01s 3/00
U.S. Cl. 331—94.5      12 Claims

ABSTRACT OF THE DISCLOSURE

An aqueous solution of a fluorescent coumarin dye is an effective laser medium for producing a laser beam having a wavelength in the blue region of the spectrum.

---

This invention relates to laser systems, and more particularly to laser systems using organic dye solutions as laser media.

Lasers (acronym for light amplification by stimulated emission radiation) or optical masers (acronym for microwave amplification by stimulated emission radiation) are light amplifying devices which produce high intensity pulses of coherent monochromatic light concentrated in a well collimated beam commonly called a laser beam. There are several uses for such laser beams. Since the beam can be sharply focused, it can produce energy densities suitable for drilling, welding, cutting, etc. In addition, laser beams are useful for aligning pipe, identifying railroad cars by reading their numbers, and monitoring current flowing through high voltage lines. One potential application of laser beams is in the field of communications where the optical spectrum represents almost limitless bandwidth and information carrying capacity.

In these and other applications it is desirable to have lasers which are operable at many different wavelengths in the light spectrum including infrared, visible and ultraviolet regions. Since the wavelength emitted by a specific energy transition in a laser medium is tunable over only a small portion of the spectrum, it is necessary to provide a number of materials adapted for use as active laser media at various light frequencies. Most of the materials discovered thus far which are capable of acting as laser media have been in the solid and gaseous states.

In order for a material to function successfully as a laser medium, it should be relatively free of optical imperfection, i.e., there can be few if any local irregularities. Generally, gases, because of their uniform pressure when in a container, are free of these imperfections. Also, the refractive index of gases at low pressures is not appreciably changed by changes in temperature. Solids which are relatively free of optical imperfections are more difficult to attain and thus more costly. Solid, high-power lasers have a tendency to crack and the cost of a solid state laser medium is proportional to its size.

The refractive index of a particular liquid changes markedly with changes in temperature. Thus, if a liquid is to be used as a laser medium, it is desirable to maintain it at a uniform temperature throughout, preferably by circulating it through a heat exchanger. The liquid should generally be circulated at a rate sufficient to cause turbulence of the medium so as to prevent localized heating. Such localized "hot spots," if permitted to remain, cause imperfections in the refractive index and thus affect the quality of the laser beam. Although less research has gone into exploring liquids as opposed to solids and gases as potential laser media, they are very promising materials since they are less expensive than solids and do not have the inherent disadvantages which solids have such as cracking and optical imperfections.

The underlying concept behind the operation of the laser was formulated by Einstein who theorized that an excited atom or molecule could emit a photon, or quantum of light. In this process a photon emitted spontaneously from an atom or a molecule can trigger another excited atom or molecule to emit its photon prematurely. This process is called stimulated emission. If there are enough excited atoms and photons, the stimulated emission process will result in a coherent monochromatic narrow beam, more commonly known as a laser beam.

There are several means for exciting the atoms of a laser medium. These include passing an electric current through it, bombarding it with electrons or illuminating it. Generally, all three means are employed for gaseous and solid laser media. Illumination is usually used for liquid laser materials. The excitation of a liquid medium by illumination is generally termed "optical pumping" or simply "pumping." According to this method, the active atoms are "pumped" from a ground state to an excited state by the absorption of light.

Various laser structures are known in the art. One form of laser structure particularly adapted for testing various liquid laser media has been described by Sorokin et al. (IBM, Journal 11, 148 [1967]). The structure includes a resonant cavity containing a reservoir of a liquid laser medium or a liquid laser body disposed within a thin-walled quartz cylinder. To provide an energy source for exciting the atoms of the laser material, the laser body is surrounded concentrically by a lamp containing an annular region within an outer thick-walled quartz cylinder. The annular region contains an air-argon mixture and has electrodes which are operably connected to a low inductance capacitor charged by a standard high voltage supply. Coaxially disposed at either end of the resonant cavity are opposed internally reflective cavity ends such as mirrors.

The lamp is adapted to emit a pulse of "pumping" light including light having wavelengths falling within at least one absorption band of the laser material. When the lamp is activated, the resultant light pulse enters the laser body and photons of energy of appropriate absorptive wavelength are absorbed by active atoms in the body to cause these atoms to shift from an initial low energy level through a series of interlevel transitions to a high energy level from which emissive transition occurs. Lasering action can take place when the population of atoms established at this higher energy level in the laser body by such light pumping exceeds the population of atoms remaining at the initial low energy level, a condition referred to as an inversion of energy states of the laser body.

Upon reaching the inversion of energy states, individual atoms of the high-level population undergo emissive transition spontaneously, shifting to a terminal low energy level with concomitant emission of light. A portion of the spontaneously emitted light is reflected back and forth through the resonant cavity structure between its internally reflective ends. As this light passes through the laser body in multiple bidirectional reflections, it induces other atoms of the enlarged high-level population to undergo light emissive transition to the terminal level. This produces more light, some of which augments the bidirectionally reflected light in the cavity to induce still further light emissive transitions from the high-level population. It is seen that a rising pulse of bidirectionally reflected light quickly develops in the cavity, reaching a quantitatively large value as the induced emissive transition of atoms from the high-level population increases. If one of the reflective cavity ends is partially transmissive, a portion of the intense reflected light pulse will pass through the one end and out of the cavity to constitute the laser output light pulse or the laser beam. Liquid laser media have also been excited by the use of a giant pulse ruby laser. Such activation means are well known in the art.

Stimulated light emission can occur only if the magnitude of the enlarged high-level population established by the pumping light pulse exceeds the magnitude of the population of atoms remaining at the initial low energy level by a value determined by energy loss factors in the structure. The threshold condition for laser action is that at which the ratio of wave energy storage to wave energy dissipation per wave energy cycle in the cavity becomes unity. The pumping light source should have an intensity sufficient to achieve this threshold. In order for stimulated emission to occur, the laser medium must be "pumped" with sufficient light energy to cause N molecules of the dye solutions to become excited per second, wherein N is determined by the following equation:

$$N = \frac{8\pi^2}{(\pi \ln 2)^{1/2}} \cdot \frac{1}{\phi t} \cdot \frac{V}{\lambda^3} \cdot \frac{\Delta v}{v}$$

where:

$\phi$=fraction of atoms which decay by any way other than in the desired transition;
$t$=lifetime of light in the resonator;
$v$=volume of the resonator;
$\lambda$=wavelength of the emitted light in the material;
$v$=frequency of the emitted light; and,
$\Delta v$=width of the line emitted in spontaneous emission.

As mentioned above liquid laser media are very desirable because of their enhanced properties over the solid laser media. Most of the work accomplished thus far concerning liquid laser media has used inorganic liquids dispersed in a solvent as the laser medium. Very little has been reported wherein the laser medium is a purely organic material because of special problems and properties involved in the design and structure of the equipment.

It is, therefore, an object of this invention to provide a class of organic compounds useful as novel liquid laser media.

It is another object of this invention to provide novel liquid laser media which emit in the blue region of the spectrum.

It is a further object of this invention to provide novel liquid laser media which are tunable.

Another object of this invention is to provide a novel process for producing a blue laser beam from a liquid laser medium.

These and other objects of this invention are accomplished by using as a liquid laser medium an aqueous solution of a fluorescent coumarin dye. It has been found that when these materials are excited by a flash tube or a giant pulse ruby laser, a laser beam results having a wavelength in the blue region. Output energies are obtained from solutions which are $10^{-1}$ to $10^{-5}$ molar. However, maximum output energies are derived from solutions which are $10^{-2}$ to $10^{-4}$ molar.

The coumarin dye solutions of this invention can be used in any laser apparatus which employs liquid laser media; the preferred apparatus being that of Sorokin described previously. The laser media of this invention are tunable between about 420 and 520 m$\mu$ when one of the internally reflecting ends of the laser cavity is replaced by a diffraction grating. At a given angle of the grating, only light of a certain wavelength is reflected back through the laser cavity. Other wavelengths are sent in different directions. The light that goes back through the dye solution stimulates the molecules to emit more light of that same wavelength, thus producing a highly monochromatic, well collimated beam of light of the desired wavelength. The laser media are also tunable by changing the concentration of the dye, higher concentrations resulting in beams of longer wavelengths.

The pH of the coumarin dye solutions used in this invention is found to be most beneficial when it is between about 7 and 11. If the pH is below about 8, the output energy is decreased. If the pH is above about 11, little improvement in lasering quality is found and the lasering efficiency decreases substantially. The pH can be adjusted with any alkaline material such as alkali metal hydroxides like sodium or potassium hydroxide.

In addition to water other solvents may be used, the particular solvent being dependent upon the dye employed and the desired concentration. Generally, when a mixture of solvent and water are used, the resultant composition preferably contains at least about 5% by weight of water since the solution used should be at least partially polarized or should be capable of sustaining an electrical charge. In addition, if both water and solvent are used together, they should both be completely miscible.

Generally, any coumarin dye which fluoresces and is soluble in water to the extent of at least $10^{-5}$ moles per liter can be used in the laser medium of this invention. The fluorescence of the dye is visible and can be caused by any source of radiation which is incident thereto such as by X-rays, ultra-violet, infrared, visible light, etc. Representative coumarins in this class useful in this invention have the following structure:

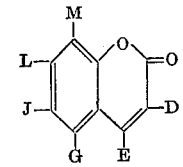

D can be
  (1) a hydrogen atom,
  (2) an alkyl radical, including substituted alkyl radicals such as an alkaryl radical, an alkyl ester radical or a glucosyloxy radical,
  (3) an aryl radical, including substituted aryl radicals such as a tolyl radical, a naphthyl radical, an arylhalide radical or an alkoxyaryl radical,
  (4) a cyano radical, or
  (5) a heterocyclic radical having 5 to 6 atoms in the hetero nucleus including at least one nitrogen atom in the hetero nucleus, and including substituted heterocyclic radicals such as a pyrazolyl radical or a benzoxazolyl radical; and
E can be
  (1) a hydrogen atom,
  (2) an alkyl radical, including substituted alkyl radicals such as an alkaryl radical or an alkyl ester radical,
  (3) a hydroxy radical, or
  (4) an aryl radical, including substituted aryl radicals such as a tolyl radical, a naphthyl radical or an alkoxyaryl radical;
G and J can be the same or different
  (1) hydrogen atom,
  (2) lower alkyl radical having 1–8 carbon atoms,
  (3) hydroxyl radical,
  (4) alkoxy radical,
  (5) cyano radical,
  (6) halogen atom, or
  (7) alkylsulfonyl, arylsulfonyl or sulfonamido radical;
L can be
  (1) a hydroxyl radical,
  (2) a hydrogen atom,
  (3) an amino radical including amino radicals substituted by at least one of the following groups:
    (a) an alkyl group,
    (b) a hydroxy group,
    (c) a heterocyclic group having 5 to 6 atoms in the hetero nucleus including at least one nitrogen atom in the hetero nucleus such as a pyrazolyl group, a triazinyl group, or a triazolyl group,
(d) an ester group, or
(4) a heterocyclic radical having 5 to 6 atoms including at least one nitrogen atom in the hetero nucleus such as pyrazolyl radical or a triazolyl radical;

M can be
(1) a hydrogen atom,
(2) a lower alkyl radical having 1-8 carbon atoms,
(3) an alkoxy radical,
(4) a cyano radical,
(5) a halogen atom,
(6) an alkylsulfonyl, arylsulfonyl or a sulfonamido radical.

The preferred compounds of the invention are substituted 7-hydroxycoumarins.

Typical water soluble coumarin dyes useful in this invention are set forth in U.S. Pats. Nos. 2,929,822, 3,014,041, 3,123,617, 3,244,711, 3,251,851, 3,271,412, 3,288,804, in British Pat. No. 1,052,692, in Netherland Pat. No. 6,607,767 and in Canadian Pat. No. 764,445. Exemplary coumarins include:

TABLE I (1) 7-hydroxy-4-methyl coumarin,
(2) 6,7-hydroxy-3-methyl coumarin,
(3) 5,7-hydroxy-4-methyl coumarin,
(4) 7-hydroxy-3-benzyl-4-methyl coumarin,
(5) 7-hydroxy-3-phenyl coumarin,
(6) 4,7-hydroxy-3-ethoxycarbonyl coumarin,
(7) 7-hydroxy-3-cyano-4-methyl coumarin,
(8) 7-hydroxy-3-methylcarbonyl coumarin,
(9) 7-hydroxy-3-phenyl-4-methyl coumarin,
(10) esculin,
(11) 7-hydroxy-3-benzoxazolyl coumarin,
(12) 7-hydroxy-4-phenyl coumarin,
(13) 7-hydroxy-5-methyl coumarin,
(14) 7-hydroxy-5-methoxy coumarin,
(15) 7-hydroxy-5-cyano coumarin,
(16) 7-hydroxy-5-chloro coumarin,
(17) 7-hydroxy-5-methylsulfonyl coumarin,
(18) 7-hydroxy-6-methyl coumarin,
(19) 7-hydroxy-6-ethoxy coumarin,
(20) 7-hydroxy-6-cyano coumarin,
(21) 7-hydroxy-6-bromo coumarin,
(22) 7-hydroxy-6-ethylsulfonyl coumarin,
(23) 3-benzoxazolyl coumarin,
(24) 7-dimethylamino-4-methyl coumarin,
(25) 7-triazolyl-4-methyl coumarin,
(26) 7-hydroxy-8-methyl coumarin,
(27) 7-hydroxy-8-ethoxy coumarin,
(28) 7-hydroxy-8-cyano coumarin,
(29) 7-hydroxy-8-chloro coumarin,
(30) 7-hydroxy-8-benzosulfonyl coumarin.

The invention is further illustrated by the following examples which include preferred embodiments thereof.

EXAMPLE 1

One liter of a $10^{-3}$ molar 7-hydroxy-4-methyl coumarin solution in water as a laser medium is placed in the shell of a heat exchange tank containing cooling coils and is circulated to and from a reservoir in the laser cavity through a conduit. The dye is circulated at a rate sufficient to cause turbulence in the reservoir and thus prevent localized heating. The pH of the dye solution is adjusted to 9.0 with sodium hydroxide. The reservoir is 15 cm. in length and 15 mm. in diameter. The remainder of the laser system is similar to that described above by Sorokin et al., IBM, Journal 11, 148 (1967). The circulation of the dye through the heat exchanger dissipates heat from the flash lamp and keeps it at a uniform temperature thus preventing localized heating so that the refractive index remains constant. The active length of the dye reservoir exposed to the flash tube is 10 cm. in length, the additional 5 cm. in length being used for connecting the flow system to and from the heat exchanger. 7½ cm. from each end of the laser reservoir containing the laser medium and coaxial therewith are silver mirrors having a 75% reflectance. The dye is excited by the light generated by the discharge of a low inductance capacitor through the annular flash tube surrounding the dye reservoir. The energy in the discharge is 100 joules at a peak voltage of 20 kv. across the flash lamp. The laser image spectrum is obtained by a densitometer trace of a spectrographic recording. This shows that the stimulated emission light appears at a maximum of 454 m$\mu$ with a width at half maximum intensity of 35° A. The output energy is approximately $10^{-2}$ joules with an output pulse width of $3 \times 10^{-7}$ seconds as measured by a radiometer (Edgerton, Germeshausen and Grier).

EXAMPLE 2

Example 1 is repeated except that esculin, a 7-hydroxy coumarin, is used in place of the 7-hydroxy-4-methyl coumarin as the laser medium. The energy in the discharge is 100 joules at a peak voltage of 20 kv. across the flash lamp. The laser image sepectrum obtained by a densitometer trace of a spectrographic recording shows the stimulated emission light to appear at a maximum of 454 m$\mu$ with a width at half maximum intensity of 35° A.

EXAMPLE 3

When compounds 2 through 9 and 11-30 of Table I are substituted in Example 1 for 7-hydroxy-4-methyl coumarin as the lasering medium similar results are obtained.

EXAMPLE 4

When one of the mirrors in the laser system of Example 1 is replaced with a Bausch and Lomb 2160 lens/mm. type replica grating and Example 1 is repeated, the coumarin dye is tuned to various wavelengths between 420 and 520 m$\mu$.

EXAMPLE 5

When the concentration of the laser medium in water is varied between $10^{-2}$ molar and $10^{-4}$ molar, and Example 1 is repeated, the medium is tuned to various wavelengths between 420 and 520 m$\mu$.

We claim:
1. In a laser system having a reservoir means for containing a laser dye solution and a light source having an intensity sufficient to excite and cause an inversion of energy states thereby causing stimulated emission of said laser dye solution, the improvement which comprises using as said laser dye solution an aqueous solution of a fluorescent coumarin dye.

2. A laser system as described in claim 1 having means for maintaining the laser dye solution at a substantially uniform temperature.

3. A laser system as described in claim 2 wherein the means for maintaining the laser dye solution at a substantially uniform temperature comprises means for circulating said laser dye solution from said reservoir means to a heat exchange means and back to said reservoir means at a rate sufficient to cause turbulence in said reservoir to reduce localized heating.

4. A laser system as described in claim 1 wherein the concentration of the aqueous solution of a fluorescent coumarin dye is from about $10^{-2}$ moles per liter to about $10^{-4}$ moles per liter.

5. A laser system as described in claim 1 wherein the wavelength of the stimulated emission is in the blue region.

6. In a laser system having a reservoir means for containing a laser dye solution positioned within a laser cavity, a light source having an intensity sufficient to excite and cause an inversion of energy states thereby causing stimulated emission of said laser dye solution and means for maintaining said laser dye solution at a substantially uniform temperature comprising means for circulating said dye solution from said reservoir means to a heat exchange means and back to said reservoir means at a rate sufficient to cause turbulence in said reservoir to reduce localized heating, the improvement which comprises using as said laser dye solution an aqueous solution of a fluorescent coumarin dye having a concentration from about $10^{-2}$ to about $10^{-4}$ moles per liter having the formula:

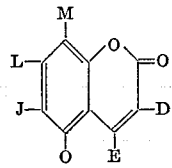

wherein:

D is selected from the group consisting of a hydrogen atom, an alkyl radical, an aryl radical, a cyano radical and a heterocyclic radical having 5 to 6 atoms in the hetero nucleus;

E is selected from the group consisting of a hydrogen atom, an alkyl radical, an aryl radical and a hydroxy radical;

G and J are each selected from the group consisting of a hydrogen atom, a hydroxyl radical, an alkyl radical, an alkoxy radical, a cyano radical, a halogen atom, an alkyl sulfonyl radical, an arylsulfonyl radical and a sulfonamido radical;

L is selected from the group consisting of a hydrogen atom, a hydroxyl radical, an amino radical, and a heterocyclic radical having 5 to 6 atoms in the hetero nucleus and including at least one nitrogen atom in the hetero nucleus; and M is selected from the group consisting of a hydrogen atom, an alkyl radical, an alkoxy radical, a cyano radical, a halogen atom, an alkylsulfonyl radical, an arylsulfonyl radical and a sulfonamido radical; the wavelength of a stimulated emission from the aqueous dye solution being in the blue region.

7. A laser system as described in claim 6 wherein the coumarin dye is a 7-hydroxy coumarin.

8. A laser system as described in claim 6 wherein the coumarin dye is 7-hydroxy-4-methyl coumarin.

9. A laser system as described in claim 6 wherein the coumarin dye is esculin.

10. A laser system as described in claim 6 including a means for tuning said laser medium comprising a diffraction grating means positioned at one end of the laser cavity.

11. A process for producing a laser beam comprising:
  (a) providing an aqueous solution of a fluorescent coumarin dye in a concentration of from about $10^{-2}$ moles per liter to about $10^{-4}$ moles per liter and
  (b) exciting said solution with a light source having an intensity sufficient to produce an inversion of energy states thereby causing a spontaneous stimulated emission.

12. A process according to claim 11 wherein the wavelength of the laser beam is in the blue region.

References Cited

UNITED STATES PATENTS 3,388,071  6/1968  Nehrich et al. _____ 252—301.2

OTHER REFERENCES

Haun Electro-Technology, September 1963, pp. 63–71.

TOBIAS E. LEVOW, Primary Examiner

A. P. DEMERS, Assistant Examiner

U.S. Cl. X.R.

252—301.2; 260—210, 248, 307, 308, 310, 343.2; 330—4.3